(12) United States Patent
Hering et al.

(10) Patent No.: US 8,886,702 B2
(45) Date of Patent: Nov. 11, 2014

(54) HARDWARE TRIGGERING IN A MANAGEMENT SYSTEM

(75) Inventors: Gerhard Hering, Unterschleissheim (DE); Detlev Otto, München (DE); Bernhard Schaupp, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1737 days.

(21) Appl. No.: 12/083,201

(22) PCT Filed: Aug. 24, 2006

(86) PCT No.: PCT/EP2006/065645
§ 371 (c)(1),
(2), (4) Date: Mar. 17, 2010

(87) PCT Pub. No.: WO2007/039354
PCT Pub. Date: Apr. 12, 2007

(65) Prior Publication Data
US 2010/0191795 A1  Jul. 29, 2010

(30) Foreign Application Priority Data
Oct. 6, 2005  (EP) .................................... 05021807

(51) Int. Cl.
*G06F 15/16* (2006.01)
*G06F 15/167* (2006.01)
*G06F 13/00* (2006.01)
*H04L 12/24* (2006.01)
*H04W 24/00* (2009.01)

(52) U.S. Cl.
CPC .......... *H04L 41/0803* (2013.01); *H04W 24/00* (2013.01)
USPC ............ 709/202; 709/212; 709/213; 711/166

(58) Field of Classification Search
USPC ....................................................... 709/202
See application file for complete search history.

(56) References Cited

U.S. PATENT DOCUMENTS

| | | | | |
|---|---|---|---|---|
| 6,327,579 | B1 * | 12/2001 | Crawford | 705/400 |
| 6,970,849 | B1 * | 11/2005 | DeMello et al. | 705/52 |
| 7,080,051 | B1 * | 7/2006 | Crawford | 705/400 |
| 7,188,089 | B2 * | 3/2007 | Goldthwaite et al. | 705/67 |
| 7,899,915 | B2 * | 3/2011 | Reisman | 709/228 |

(Continued)

FOREIGN PATENT DOCUMENTS

EP  1 365 608  11/2003

OTHER PUBLICATIONS

"FLEX*lm* End Users Guide" Version 7.2, GLOBEtrotter Software, Inc., Dec. 2000.

*Primary Examiner* — Ranodhi Serrao
*Assistant Examiner* — Farrukh Hussain
(74) *Attorney, Agent, or Firm* — Staas & Halsey LLP

(57) ABSTRACT

A method operates a management system having at least one manager and one agent and said manager is provided with information containing plurality of information items for triggering. The information items are stored for triggering in the manager memory. At least one information item for triggering is transmitted by the manager to the agents in such a way that said information item for triggering effects at least one hardware unit at the agent. Afterwards the at least one information item for triggering is erased from or marked in the manager memory.

18 Claims, 2 Drawing Sheets

(56) References Cited

U.S. PATENT DOCUMENTS

| | | | |
|---|---|---|---|
| 2003/0217009 A1* | 11/2003 | Fumagalli et al. | 705/51 |
| 2005/0026649 A1* | 2/2005 | Zicker et al. | 455/552.1 |
| 2005/0050401 A1* | 3/2005 | Matsuki et al. | 714/42 |
| 2005/0102240 A1* | 5/2005 | Misra et al. | 705/59 |
| 2005/0177624 A1* | 8/2005 | Oswald et al. | 709/219 |
| 2005/0256805 A1* | 11/2005 | Satkunanathan et al. | 705/59 |
| 2007/0281623 A1* | 12/2007 | Liu | 455/67.11 |
| 2010/0191795 A1* | 7/2010 | Hering et al. | 709/202 |

* cited by examiner

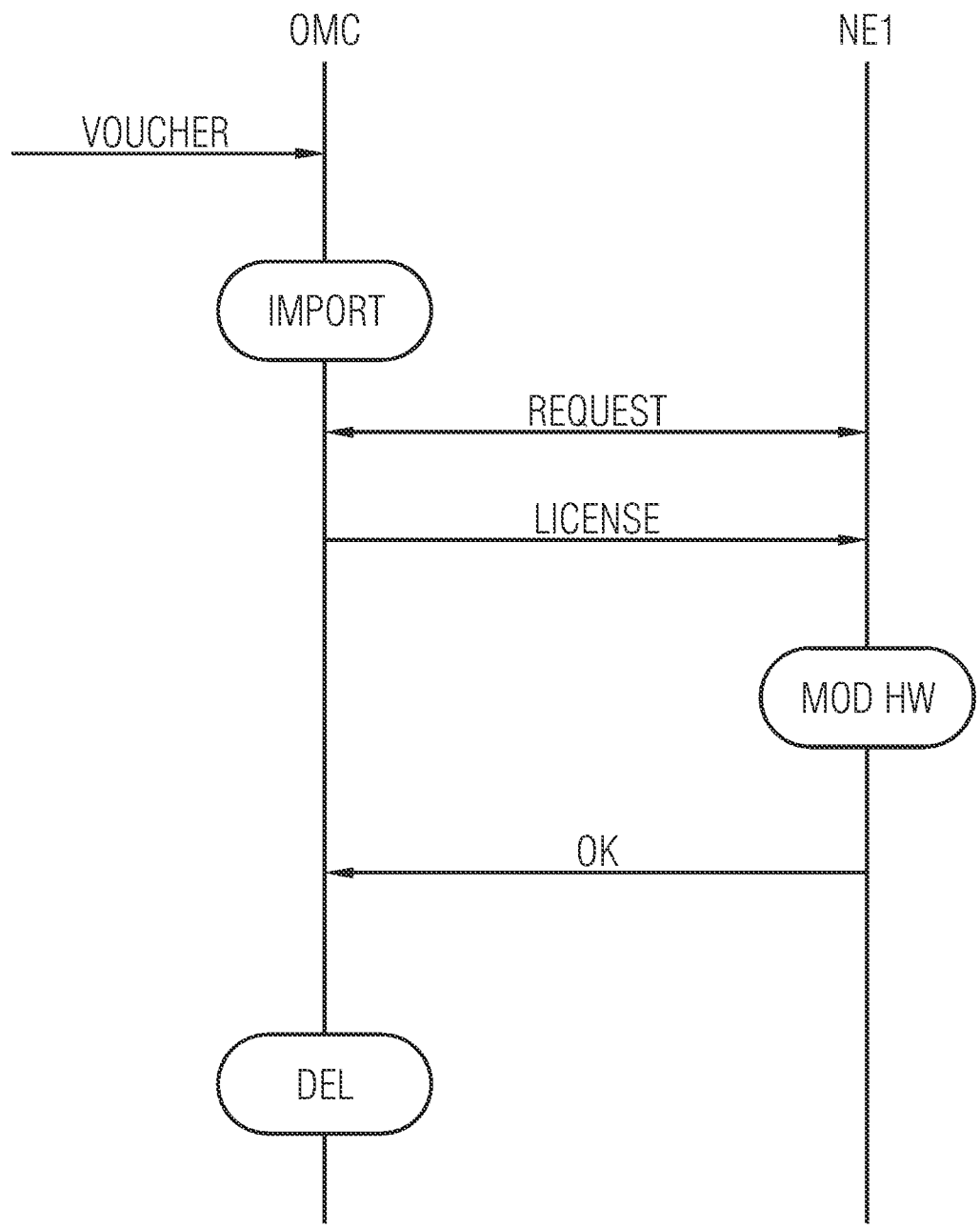

HARDWARE TRIGGERING IN A MANAGEMENT SYSTEM

CROSS REFERENCE TO RELATED APPLICATIONS

This application is based on and hereby claims priority to European Application No. EP05021807 filed on Oct. 6, 2005 and PCT Application No. PCT/EP2006/065645 filed on Aug. 24, 2006, the contents of which are hereby incorporated by reference.

BACKGROUND OF THE INVENTION

The invention relates to a method for operating a management system having at least one manager and one agent.

According to the principles of a management network, also called TMN (Telecommunications Management Network) principles, there are a plurality of management layers for the management of a communication system—such as, for example, of a mobile radio communication system—, wherein each layer, with the exception of the topmost and bottommost layer, has a dual function, namely a manager function and an agent function.

The network management can comprise, among other things, the fault management and/or the configuration management and/or the security management and/or the accounting management and/or the performance management. The network management is intended to provide suitable mechanisms for information distribution and administration so that, if necessary, a comprehensive picture of the state of the network is available and the individual resources of the telecommunication network can be monitored and configured efficiently.

With respect to mobile radio communication systems, there are management interfaces, for example between the network element management level, on the one hand, and the network element level, on the other hand. An example of network facilities of this manager-agent interface is represented by the operation and maintenance centers (OMC) at the network element management level and network element level facilities such as, e.g. base stations of the base station system (BSS) of a GSM mobile radio network or base stations of other communication networks, for example node Bs of a UMTS (Universal Mobile Telecommunication System) mobile radio network or radio access points of a WLAN (Wireless Local Area Network) system, for example according to one of the IEEE 802.11 standards. There are also management interfaces and manager/agent interfaces, respectively, between the network management level, on the one hand, and the network element management level, on the other hand. An example of network facilities for this manager/agent interface is represented by the network management centers (NMC) at the network management level and the operation and maintenance centers (OMC) at the network element management level, e.g. in the said UMTS or another mobile radio or telecommunication network.

It is possible that there are facilities in a management system which have untriggered hardware. This means that the relevant facilities cannot use the potential performance of this hardware before it is triggered. Such a situation occurs, e.g. when the manufacturer of the respective facility has equipped it with hardware which the purchaser of the facility does not need at this time or is not prepared to pay for. Triggering usually occurs in that a person authorized to perform triggering interrupts the operation of the facility at the location of the respective facility and performs the required measures for triggering.

SUMMARY

One possible object is demonstrating an efficient method for operating a management system which is intended to provide for triggering of hardware units of an agent. Furthermore, a manager and a computer program product for carrying out the method are to be presented.

The inventors propose a method for operating a management system having at least one manager and one agent, the manager is provided with information items. These information items comprise a plurality of triggering information items. The triggering information items are stored in a memory of the manager. At least one of the triggering information items is sent by the manager to the agent whereupon it effects the triggering of at least one hardware unit in the agent. Furthermore, at least one of the triggering information items is erased or marked in the memory of the manager.

The proposed method can be used in various types of management systems, wherein the manager in each case assumes a higher-level function compared with the agent. The manager is provided with information items which comprise a plurality of triggering information items. This means that there is a group of triggering information items having at least two components, which are available simultaneously to the manager. The several triggering information items can be provided to the manager, e.g. in a common message or on a common data medium. The manager stores the triggering information items, the storing taking place in a memory of the manager or at least in a memory which can be accessed by the manager.

Each triggering information item is capable of triggering a hardware unit of an agent. Since several triggering information items are available to the manager, this means that, using these triggering information items, a plurality of hardware units can be triggered. If an agent has an untriggered hardware unit, this hardware unit is established at/in the agent but cannot be used by it for its intended purpose. It needs to be triggered which has the effect that the hardware unit established at/in the agent can now be used as intended.

A hardware unit is triggered after the agent has received a triggering information item from the manager. In this context, an individual triggering information item or a plurality of triggering information items can be sent out by the manager to the agent and correspondingly one or more hardware units can be subsequently triggered. In this context, the triggering occurs preferably automatically, i.e. without requiring the interaction of personnel at the location of the agent or of personnel which act on the agent.

The at least one triggering information item which effects the triggering of at least one hardware unit is erased or marked. This means that the at least one triggering information item which is used by the manager for triggering a hardware unit at the agent does not remain unchanged in the memory of the manager.

As a development of the proposed method, the information items are provided to the manager encrypted and are decrypted by the manager before being stored, wherein, for the decryption, a quantity which unambiguously identifies the manager and cannot be modified by the manager is interrogated. Due to the fact that the quantity unambiguously identifies the manager, the fact that a quantity needed for decryption cannot be modified by the manager has the effect that the information items cannot be decrypted by another management facility of the management system. This is because the attempt by another management facility to decrypt the information items would lead to a quantity unambiguously identifying the other management facility being used for decryption which, however, cannot result in successful decryption.

It is advantageous if the erasing or marking occurs automatically, either after the reception at the manager of a message relating to the completed triggering, coming from the agent, or after the sending out of the at least one of the triggering information items by the manager. That the erasing or marking takes place automatically means that as soon as the respective one of the two abovementioned conditions has occurred, erasing or marking can no longer be avoided.

As an embodiment of the proposed method, the at least one of the triggering information items, due to the erasing and/or marking, loses its capability of being able to trigger at least one hardware unit. A triggering information item can thus not be used several times for triggering a hardware unit. This can be realized, e.g. in that an erased or marked triggering information item is discarded as illegal by the agent and, as a result, the triggering is prevented.

According to a preferred development, the information items comprise triggering information items for various types of hardware units. The manager is thus provided with at least one triggering information item for a first type of hardware unit and at least one second triggering information item for a second type of hardware unit. The various types of hardware units can be hardware units of one or more agents.

The triggering information items are preferably stored in such a manner that the triggering information items can neither be copied nor modified by the manager. This means that the manager is not able to duplicate triggering information items or alter the triggering information items. As a result, the triggering information items can be efficiently protected against misuse.

As an embodiment, the manager, before sending out the at least one of the triggering information items, receives information items relating to at least one triggerable hardware unit of the agent. The information items received by the manager can be, e.g. a plurality of already triggered hardware units, possibly related to a particular type of hardware units, or a plurality of hardware units not yet triggered, possibly related to a particular type of hardware units.

As a development, at least one further one of the triggering information items is sent by the manager to a further agent whereupon the at least one further one of the triggering information items effects the triggering of at least one hardware unit in the further agent. In this case, different triggering information items are sent to different agents by the manager. It is advantageous if each triggering information item can be used for triggering a hardware unit of each agent, possibly with the prerequisite that the respective agent has a type of hardware unit corresponding to the triggering information items. In this case, the triggering information items are not agent-specific.

It is possible that the at least one of the triggering information items effects a temporary triggering of at least one hardware unit in the agent. This means that the respective hardware unit can be used by the agent for a particular period of time or up to a particular point in time. After that, the triggering is automatically ended.

The inventors also propose a manager for a management system having at least the manager and one agent has a memory for storing a plurality of triggering information items in a memory, wherein each of the triggering information items can effect the triggering of at least one hardware unit in the agent, and a transmitter for sending out at least one of the triggering information items to the agent, and an attenuation unit for erasing or marking the at least one of the triggering information items in the memory.

The computer program product for a management system having at least one manager and one agent has a unit for storing a plurality of triggering information items in a memory of the manager, and a unit for triggering at least one hardware unit of the agent after reception of at least one triggering information item sent by the manager, and a unit for erasing or marking the at least one triggering information item in the memory.

A computer readable medium is understood to be, apart from the actual computer program (with its technical effect going beyond the normal physical interaction between program and computing unit), in particular, a recording medium for the computer program, a file collection, a configured computing unit but also, for example, a memory device or a server on which files belonging to the computer program are stored.

The proposed manager and the computer program are suitable, in particular, for carrying out the proposed method according to the invention, wherein this can also apply to the embodiments and developments. For this purpose, they can have other suitable devices.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a flow chart for the proposed method.

DETAILED DESCRIPTION OF THE PREFERRED EMBODIMENT

Figure 1:
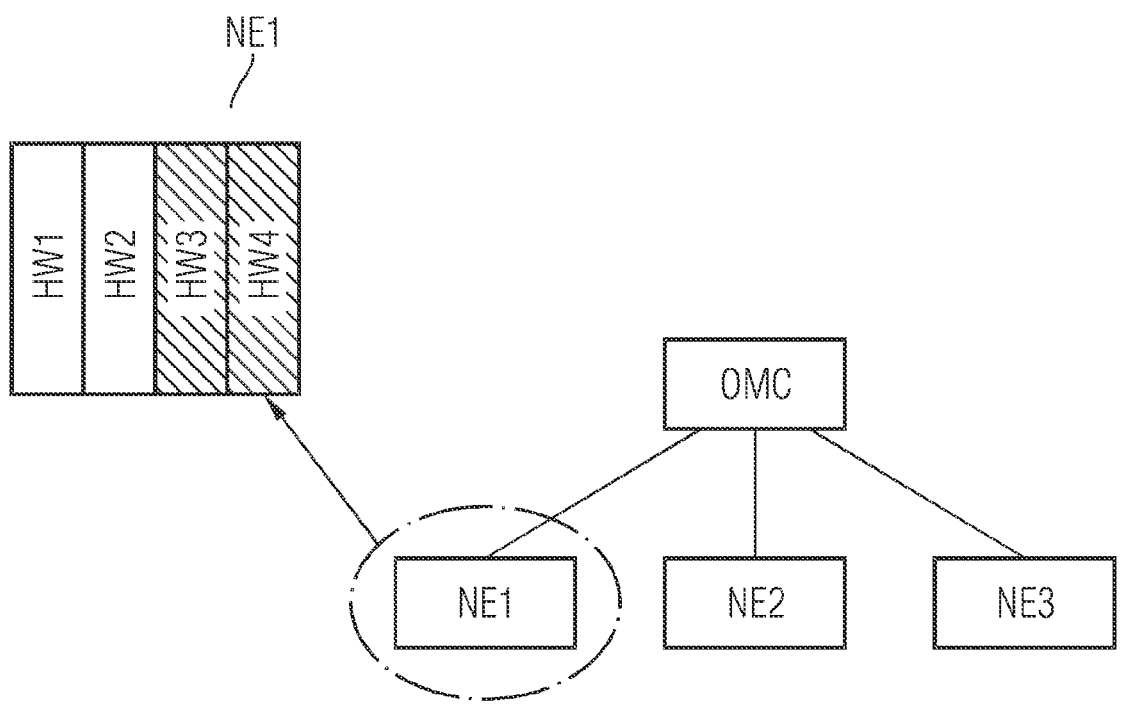
FIG. 1 shows a section from a management system.

Reference will now be made in detail to the preferred embodiments of the present invention, examples of which are illustrated in the accompanying drawings, wherein like reference numerals refer to like elements throughout.

The section from a management system of a radio communication system, shown in FIG. 1, comprises the operating and maintenance center OMC, and the network elements NE1, NE2 and NE3. The network elements NE1, NE2 and NE3 can be, e.g., base stations. As shown by way of example by the network element NE1, the network elements have a plurality of hardware modules or units. By way of example, it is assumed that the network element NE1 has the four hardware modules HW1, HW2, HW3 and HW4.

Although the network element NE1 has the four hardware modules HW1, HW2, HW3 and HW4, it cannot use every one of the hardware modules HW1, HW2, HW3 and HW4. Currently, only the two hardware modules HW1 and HW2 can be used by the network element NE1. To be able to use also the two hardware modules HW3 and HW4, shown dashed, these modules must be triggered. The hardware modules HW1, HW2, HW3 and HW4 can be, e.g., channel elements of so-called channel cards and/or cells of a DRIC (Digital Receiver) FIG. 2 shows the sequence of a method which leads to the triggering of one or both of the hardware modules HW3 and HW4.

The operation and maintenance center OMC is provided by the manufacturer of the operation and maintenance center OMC and of the network elements NE1, NE2 and NE3 with a data medium, e.g. in the form of a CD-ROM, with VOUCHER information items. This providing occurs after the operation and maintenance center OMC or the operator of the network management system has requested licenses for triggering hardware modules. The VOUCHER information items contain a plurality of such licenses. Various ones of the licenses can be suitable for various types of hardware modules. Although each of the licenses is specific to a particular type of hardware module, it is not specific to a particular network element. This means that each license of the VOUCHER data medium can be used by the operation and maintenance center OMC for each one of the network elements NE1, NE2 and NE3 monitored by it, if the respective network element has a triggerable hardware module of the respective type. Thus, the operator does not have to decide at the time of purchasing the licenses for which network elements the licenses are to be used as a result of which he is able to respond flexibly to bottlenecks during the operation of the radio communication system.

The VOUCHER information items contained on the data medium are encrypted. In the IMPORT step, the operation and maintenance center OMC decrypts the data and stores them. A quantity specific to the operation and maintenance center OMC such as, e.g., the MAC address of the operation and maintenance center OMC, is used for encrypting and decrypting. This is a quantity "burnt in" to the operation and maintenance center OMC during the production of the operation and maintenance center OMC, which cannot be changed. This ensures that the VOUCHER information items can be decrypted only by the operation and maintenance center OMC for which they are intended and were created.

The individual licenses of which the VOUCHER information items are composed are available in plain text, i.e. unencrypted, after the decryption. However, they are protected against manipulation by a digital signature or another check sum. This means that, although the operator of the management system can read and use the licenses, he cannot change them. Manipulation of a license would lead to the result that during the attempt of using the license for triggering a hardware module in a network element, the network element would recognize it as invalid and discard it. Thus, hardware modules can only be triggered by licenses which were contained in the VOUCHER information items and have not been changed.

The VOUCHER information items are stored in the IMPORT step in the form of a file which, although it can be read by the operation and maintenance center OMC or by the operator of the operation and maintenance center OMC, cannot be changed. This makes it possible to prevent the operator from adding to the licenses originally contained in the data of the VOUCHER data medium other ones. The readability of the file also ensures that the operation and maintenance center OMC or the operator of the operation and maintenance center OMC is able to check how many and possibly also which licenses are currently available to him or it, i.e. have not yet been used up by him or it.

Furthermore, the file stored by the operation and maintenance center OMC, which contains the licenses, cannot be copied. However, it is possible to transfer the file to another operation and maintenance center. After the operation and maintenance center OMC has decrypted the VOUCHER information items, the licenses can no longer be used only for the network elements monitored by the operation and maintenance center OMC. However, since the file containing the licenses cannot be duplicated, the number of licenses available to the operator of the management system cannot be increased even when licenses are transferred from the operation and maintenance center OMC to other management facilities.

The REQUEST step of the communication between the operation and maintenance center OMC and the network element NE1 takes place. This can contain, e.g. a request of the operation and maintenance center OMC to the network element NE1 for the number of hardware modules already triggered or activated, respectively. Since the operation and maintenance center OMC or the operator of the operation and maintenance center OMC knows how many hardware modules the network element NE1 has, he/it can determine by the request how many triggerable hardware modules are present in the network element NE1. As an alternative, the enquiry about the number of hardware modules already activated can also be made by an LMT (Local Maintenance Terminal) which is connected to the network element NE1 on site.

After it has been determined that triggerable hardware modules are present at the network element NE1, the operation and maintenance center OMC or the operator of the operation and maintenance center OMC can decide that one or more hardware modules of the network element NE1 should be triggered. As an alternative, it is possible that the network element NE1, in the REQUEST step, demands the triggering of one or more other hardware modules whereupon the operation and maintenance center OMC or the operator of the operation and maintenance center OMC decides that such a triggering should take place.

Following this, the operation and maintenance center OMC sends one of the licenses to the network element NE1 in the LICENSE step. The network element NE1 recognizes that the received message is a license for triggering a particular type of hardware module. The received license is read in, preferably using an EEPROM (Electrically Erasable Programmable ROM), a memory chip which can be written to and erased several times, the stored data of which are retained even after an interruption of the power supply, of the hardware module to be triggered, whereupon the hardware module is triggered automatically in the MOD HW step. After completed triggering of a hardware module, the network element NE1 can be assigned to another operation and maintenance center OMC of the management system without any change in the triggered state of the hardware module. The triggered hardware module can also be transported to another network element and then takes along its triggered functionality.

Instead of sending out individual licenses from the operation and maintenance center OMC to the network element NE1, a plurality of licenses can also be transferred. This "en block" transfer saves time. Licenses can be grouped before the sending out by using script files.

After completed activation of the hardware module or modules in the MOD HW step, the network element sends a positive acknowledgement message to the operation and maintenance center OMC in the OK step. After the operation and maintenance center OMC has received the acknowledgement message, the license/licenses used are automatically erased or the license/licenses used are marked as consumed in the DEL step. The fact that the DEL step occurs automatically means that the operator of the operation and maintenance center OMC cannot prevent this step from being carried out. A license marked as consumed can no longer be used for triggering hardware modules. Should this be attempted, nevertheless, this license will be rejected as invalid in the network element. As an alternative, it is possible that the network element does not recognize whether a license is valid or not but, when receiving a license, directs an enquiry to the operation and maintenance center OMC as to whether the received license is valid. The license can only effect a triggering of a hardware module if a positive response from the operation and maintenance center OMC that the respective license is valid is received.

If the network element NE1 receives licenses for hardware modules which it does not have or all of which are already triggered, the network element NE1 informs the operation and maintenance center OMC that the licenses or at least a part of the licenses have not been used. Due to this return message by the network element NE1, this license/these licenses are not erased or marked as consumed at the operation and maintenance center OMC.

There is preferably at least one copy of the file which contains the licenses in the operation and maintenance center OMC. This is intended to prevent the file from being lost during a system crash. This is because, in this case, the operator of the operation and maintenance center OMC could not prove how many unconsumed licenses were still available to him.

The method described can be applied both to permanent licenses and to temporary licenses. A temporary license only provides for triggering for a particular period of time. After the period of time has elapsed, the respective hardware module is automatically deactivated again so that a new triggering would be necessary for being able to utilize the hardware module permanently. As a result, features can be provided to the system for "trying out".

The method described has advantages both for the manufacturer of the network elements and for the operator of the management system: the manufacturer of the network elements can equip all network elements with the same hardware modules and thus with the maximum number of hardware modules even if the purchaser currently does not need and does not request such a range of hardware resources. This uniform procedure with respect to all network elements has an advantageous effect on the operating and procurement costs for the manufacturer of the network elements. The operator of the management system pays at the beginning, i.e. when purchasing the network elements, only for certain hardware modules which are thus available to him without the triggering. When the method is used, further hardware modules can be triggered with fine granularity, namely individually for each hardware module. As a result, the operator only needs to pay for those hardware modules which he would like to actually use.

According to the related art, the triggering of hardware modules of network elements requires intervention in the operating system of the network element at the location of the network element. In contrast, the method provides for "remote" triggering without having to use for this purpose personnel on site at the network element. This saves costs and reduces the time expended for the triggering. Furthermore, it is possible that the "remote" triggering removes the obligation to switch off the network element during the triggering process so that the normal operation of the network element does not need to be interrupted.

After the operation and maintenance center OMC has received the VOUCHER data medium, no facility external to the radio communication system is involved in the triggering. As a result, the management system does not experience any loss of security.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a management system having a manager and an agent, comprising:
   providing encrypted information items from an external unit to the manager, the information items comprising a plurality of triggering information items;
   interrogating a quantity, which identifies the manager and cannot be modified by the manager, for decryption of the information items before storage of the information items;
   storing the triggering information items in a memory of the manager;
   sending an active triggering information item from the manager to the agent, the agent comprising at least one hardware unit in a deactivated state in which the hardware unit cannot be used by the agent;
   using the active triggering information item to trigger the at least one hardware unit at the agent to change its deactivated state to an activated state in which the hardware unit can be used by the agent; and
   erasing the active triggering information item from the memory of the manager or marking the active triggering information item in the memory of the manager,
   wherein each triggering information item is specific to a particular type of hardware unit, but is not specific to a particular agent so that each triggering information item is capable of activating a hardware unit in any one of a plurality of agents having a triggerable hardware unit of the particular type.

2. The method as claimed in claim 1, wherein
   the agent sends a message to the manager indicating that the hardware unit has been triggered, and
   the active triggering information item is erased or marked automatically after reception by the manager of the message from the agent.

3. The method as claimed in claim 1, wherein
   the active triggering information item is erased or marked automatically after the active triggering information item is sent by the manager.

4. The method as claimed in claim 1, wherein
   erasing or marking the active triggering information item causes the manager to lose a capability of being able to trigger the hardware unit in the agent.

5. The method as claimed in claim 1, wherein the information items comprise triggering information items for various types of hardware units.

6. The method as claimed in claim 1, wherein the triggering information items are stored in such a manner that the triggering information items can neither be copied nor modified by the manager.

7. The method as claimed in claim 1, wherein the manager, before sending the active triggering information item, receives an information item indicating that the hardware unit of the agent can be triggered.

8. The method as claimed in claim 1, wherein
   the management system has first and second agents,
   the manager sends a first active triggering information item to the first agent and a second active triggering information item to the second agent,
   the first active triggering information item triggers a first hardware unit in the first agent,
   the second active triggering information item triggers a second hardware unit in the second agent.

9. The method as claimed in claim 1, wherein the active triggering information item effects a temporary triggering of the hardware unit in the agent.

10. The method as claimed in claim 1, wherein
the agent sends a message to the manager indicating that the hardware unit has been triggered, and
the active triggering information item is erased or marked automatically after reception by the manager of the message from the agent.

11. The method as claimed in claim 10, wherein
erasing or marking the active triggering information item causes the manager to lose a capability of being able to trigger the hardware unit in the agent.

12. The method as claimed in claim 11, wherein the information items comprise triggering information items for various types of hardware units.

13. The method as claimed in claim 12, wherein the triggering information items are stored in such a manner that the triggering information items can neither be copied nor modified by the manager.

14. The method as claimed in claim 13, wherein the manager, before sending the active triggering information item, receives an information item indicating that the hardware unit of the agent can be triggered.

15. The method as claimed in claim 14, wherein the active triggering information items effect a temporary triggering of the hardware units in the first and second agents.

16. A manager for a management system having a manager and at least one agent, comprising:
a receiver to receive encrypted information items from an external unit, the information items comprising a plurality of triggering information items, and to interrogate a quantity, which identifies the manager and cannot be modified by the manager, for decryption of the information items before storage of the information items;
a memory to store the plurality of triggering information items, each of the triggering information items being able to trigger a respective hardware unit in the at least one agent, the at least one agent comprising at least one hardware unit in a deactivated state in which the hardware unit cannot be used by the at least one agent;
a transmitter to transmit an active triggering information item to the at least one agent to trigger the at least one hardware unit to change its deactivated state to an activated state in which the hardware unit can be used by the at least one agent; and
an alteration unit to erase the active triggering information item from the memory or mark the active triggering information item in the memory,
wherein each triggering information item is specific to a particular type of hardware unit, but is not specific to a particular agent so that each triggering information item is capable of activating a hardware unit in any one of a plurality of agents having a triggerable hardware unit of the particular type.

17. A non-transitory computer readable storage medium to store a program, which when executed by a computer, causes the computer to perform a method for operating a management system having a manager and an agent, the method comprising:
providing encrypted information items from an external unit to the manager, the information items comprising a plurality of triggering information items;
interrogating a quantity, which identifies the manager and cannot be modified by the manager, for decryption of the information items before storage of the information items;
storing the triggering information items in a memory of the manager;
sending an active triggering information item from the manager to the agent, the agent comprising at least one hardware unit in a deactivated state in which the hardware unit cannot be used by the agent;
using the active triggering information item to trigger the at least one hardware unit at the agent to change its deactivated state to an activated state in which the hardware unit can be used by the agent; and
erasing the active triggering information item from the memory of the manager or marking the active triggering information item in the memory of the manager,
wherein each triggering information item is specific to a particular type of hardware unit, but is not specific to a particular agent so that each triggering information item is capable of activating a hardware unit in any one of a plurality of agents having a triggerable hardware unit of the particular type.

18. A method for operating a management system having a manager and an agent, comprising:
providing encrypted information items from an external unit to the manager, the information items comprising a plurality of triggering information items;
interrogating a quantity, which identifies the manager and cannot be modified by the manager, for decryption of the information items before storage of the information items;
storing the triggering information items in a memory of the manager;
sending an active triggering information item from the manager to the agent, the agent comprising a plurality of hardware units at least one of which being in an activated state so that a hardware unit is usable by the agent and at least one of which being in a deactivated state so that a hardware unit is not usable by the agent;
using the active triggering information item to trigger the at least one hardware unit in a deactivated state to change its deactivated state to an activated state in which the hardware unit is useable by the agent; and
erasing the active triggering information item from the memory of the manager or marking the active triggering information item in the memory of the manager,
wherein each triggering information item is specific to a particular type of hardware unit, but is not specific to a particular agent so that each triggering information item is capable of activating a hardware unit in any of a plurality of agents having a triggerable hardware unit of the particular type.

* * * * *